Oct. 15, 1935.  G. J. EASTER  2,017,056
FURNACE REFRACTORY
Filed April 17, 1934
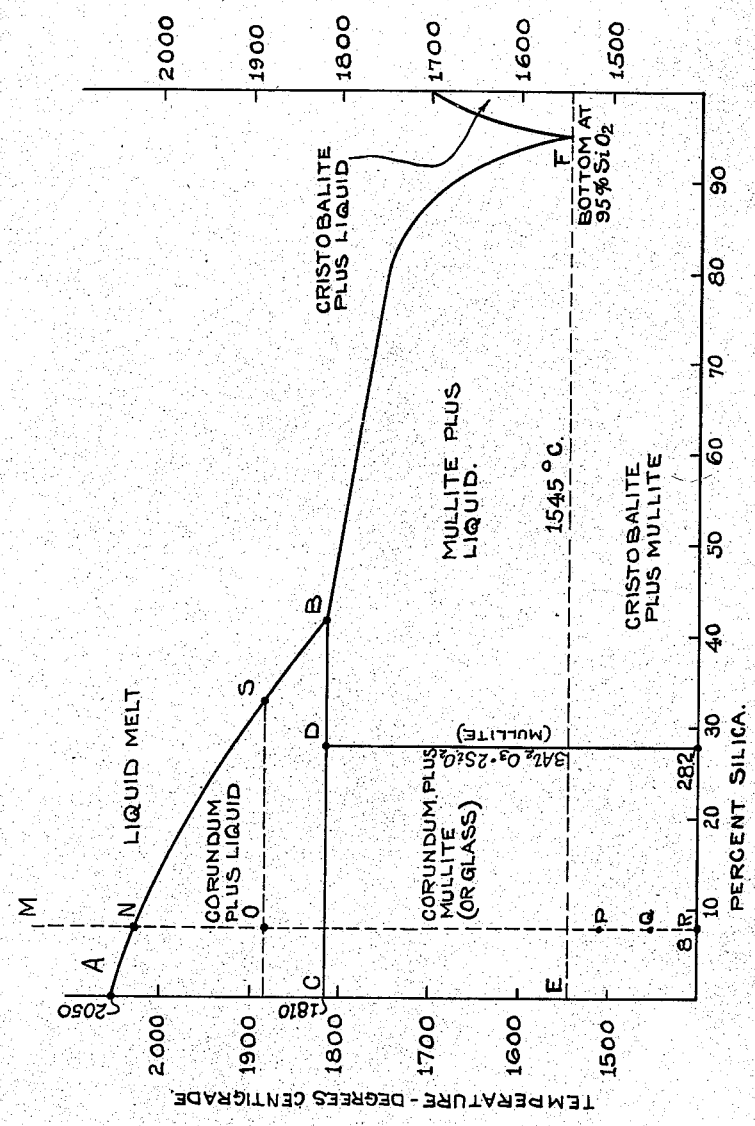
INVENTOR.
GEORGE J. EASTER
BY RCBenner
ATTORNEY.

Patented Oct. 15, 1935

2,017,056

UNITED STATES PATENT OFFICE 2,017,056

FURNACE REFRACTORY

George J. Easter, Niagara Falls, N. Y., assignor to The Carborundum Company, Niagara Falls, N. Y., a corporation of Pennsylvania Application April 17, 1934, Serial No. 720,989

10 Claims. (Cl. 49—79)

This invention relates to glass tanks and to similar furnaces in which refractory materials must be used to resist corrosion in the operation of the furnace. In the construction of furnaces of various types in which the refractory lining is subjected to the action of corrosive molten materials, and particularly in the case of glass tanks, use has been made of cast refractory pieces consisting essentially of mullite crystals and corundum crystals embedded in a glassy matrix. In these cast refractory pieces, in general the percentage of mullite is higher than the percentage of corundum. These refractories have not been entirely satisfactory, as they are somewhat subject to corrosion, particularly at the metal line.

I have discovered that refractory pieces composed essentially of corundum crystals may be produced from relatively inexpensive raw materials containing from 5 to 30% of silica, that the fusion produced from this raw material is considerably easier to handle than pure alumina due to a somewhat lower melting point and greater fluidity of the molten mass, and that the resulting product is markedly superior in its resistance to the corrosive effect of glass and slags than the type of refractories above referred to. In accordance with my invention, I melt raw materials to obtain a fusion which does not differ materially from the fusion from which the above mentioned type of refractory pieces are cast; but by a quick cooling through a certain temperature range minimize formation of mullite crystals; and then bring about solidification at a predetermined lower temperature, at which lower temperature the matrix becomes for the most part a glassy mass. This process results in the production, from a fusion having substantially the same composition as the fusion heretofore used of refractories which are markedly superior to the refractories composed of a mixture of corundum and mullite crystals as produced by the conventional process. The improved performance of the product produced in accordance with my invention I attribute to its low content of mullite crystals which apparently are more readily attacked by the corrosive glass or slag in the furnace, the failure of the mullite particles causing the gradual disintegration of the refractory piece. While the greater resistance to corrosion which characterizes my improved product may be due to other causes of which I am not aware, the high content of the mullite crystals in the refractories as heretofore produced appears to be the cause of the more rapid disintegration of these refractories; as the difference in resistance to corrosion between the two refractories is too great to be attributed solely to slight differences in composition of the raw materials from which the refractories are made. The silica appears in my improved refractory pieces as a glassy matrix, so that I do not attribute the improved qualities of my refractory pieces to the matrix.

The method of producing cast refractory articles in accordance with my invention may be more readily understood by referring to the accompanying drawing, in which the temperature equilibrium diagram of the alumina-silica system is shown. In this figure, the various fields are marked to indicate the constituents which are in equilibrium after a molten mass of a given composition has been cooled very slowly through certain temperature ranges.

As has been above pointed out, it is more convenient to cast blocks composed of a mixture of alumina with a moderate amount of silica, say from 5 to 20%, or even as high as 30%, than to cast blocks of relatively pure alumina, as the presence of the silica increases the fluidity of the fusion and reduces the coefficient of expansion of the cast pieces. The presence of appreciable percentages of silica, particularly if more than 10% is used, normally tends to produce mullite rather than corundum crystals in the cast blocks. While the production of cast refractory articles from these mixtures of alumina with from 5 to 30% of silica is desirable from the point of view of both ease of manufacture and of economy due to the lower cost of the raw materials, the presence of the mullite crystals in the final product appears to be a detriment; since I have found that blocks in which alumina crystals predominate, and particularly where the proportion of alumina crystals to mullite crystals is as high as two to one, are definitely superior to blocks of the same ultimate analytical composition in which mullite crystals predominate. This superiority manifests itself, for instance, in improved ability to resist corrosion by glass and vitreous slags. It is therefore quite desirable in the production of fused cast refractories that the castings be so manipulated as to result in the formation of a maximum amount of alumina crystals and a minimum amount of mullite as effected by my invention.

In order to understand my method of manipulation of cast pieces to produce therein a maximum amount of corundum, consider a melt containing approximately 8% of silica, this composition being represented on the diagram by the line M—R. After a refractory melt of this composition is cast it cools in the mold, and when a temperature corresponding to point N is reached corundum crystals begin to separate out of the melt. This crystallization of corundum normally continues until cooling reaches the temperature represented by line C—D; the position of the remaining liquid having, in the meantime, changed to that represented by point B.

When this temperature corresponding to the incongruous melting point of mullite at line C—D (which is 1810° C. in the case of pure material) is reached, it is found that if the rate of cooling is slow enough, a considerable proportion of the corundum crystals re-dissolve in the liquid and form mullite which immediately crystallizes out. This solution and crystallization action are not instantaneous but, on the contrary, require considerable time. If allowed to proceed to equilibrium, the mixture of corundum and mullite which remains is stable at all lower temperatures and the compositions of a refractory which is thus slowly cooled is always found to be corundum plus mullite or mullite alone if the mix corresponds in composition to point D. A slight amount of residual glass results in case sufficient time is not allowed for the reaction of the corundum and liquid to proceed to equilibrium. The procedure just described and the composition of the blocks given are characteristic of the production of cast refractories as described by Tone in U. S. Patents No. 906,173 and 906,339, by Allen in U. S. Patent 1,001,497, and by Fulcher in U. S. Patent No. 1,615,750.

In contradistinction to this process let us now consider the different process which I have found to produce refractories in which a minimum of mullite is formed and a maximum of corundum. If the melt previously considered is allowed to cool until a point O above the line C—D is reached, the crystalline constituent is entirely corundum and the composition of the liquid corresponds to point S. If thereafter cooling is allowed to proceed relatively rapidly to a temperature materially below the line C—D, the corundum is very slowly soluble in the residual liquid and remains largely undissolved. A temperature of 50–100° C. below the line C—D is probably sufficient to reduce the solvent action of the residual liquid substantially to a minimum. I find, however, that it is desirable to carry the rapid cooling considerably beyond such a temperature, say for instance, to a point corresponding to P on the diagram. In this way, the residual liquid of composition corresponding to point S is largely retained in the form of a glass, whereas if cooling has been only to a point between line C—D and line E—F this liquid would have broken down to form mullite plus additional liquid, which liquid has a tendency to dissolve corundum with the formation of additional mullite.

It is thus seen that what I attempt to do is to cool the cast block relatively rapidly from a temperature at which corundum is the only stable solid phase to a temperature at which the entire melt is solidified. Cooling thereafter may be as slow as is found desirable in order to equalize any strains in the blocks.

It will be noted that the difference between my improved refractories and the refractories referred to above as resulting from the conventional practice does not arise from any material difference in the ingredients melted to be cast into refractory pieces; but rather in that the silica appears in my improved product in the glassy matrix for the most part. As the crystalline alumina appears to be more resistant to slags than is the inter-crystalline glass, I find that, in general, cast refractories consisting largely of alumina and containing for instance not more than 8% of silica are superior to those in which a larger amount of silica is present.

In order to secure the desired rapid cooling it is necessary that the outer portion of the block be cooled materially below the point representing the average temperature of the entire block. If, for instance, the average temperature of the block is represented by P, the temperature of the outer surface would be that represented by Q; and in order that the block may possess a minimum of internal strains it is found desirable to thereafter raise the temperature of the portion which is below the average until such time as the entire block is at the same temperature. This may be done by the application of external heat or by insulating the outside and preventing further heat loss until such time as the outer shell has been heated by the interior portion and the temperature of the entire block equalized.

In carrying out the fusion, the furnace generally consists of a water-cooled iron shell without any lining other than that built up by the material being fused as it is fed into the furnace. Fusion is effected initially by the heat from a carbon train between two or more electrodes inserted in the iron shell; but after a bath of molten material is formed the resistance of the fused material to the passage of electric current through it is used to supply the heat. The material is fed in gradually, and the electrodes raised as the fused mass is built up. The furnace technique is quite similar to that employed in making aluminous abrasives.

When the material has arrived at the proper temperature and the correct degree of fluidity, it may be poured into molds of the desired shape and size. The furnace may be adapted either for tapping the molten material out through its side, or it may be arranged to be tilted so as to pour the material into the mold. Particularly in the latter case, it is desirable that provision be made to prevent molten material spilling into the water-cooling system. This may be accomplished by the use of an iron apron properly positioned.

The molds may be made of metal, such as chrome iron, cast iron, copper, or of carbon or graphite, or of bonded refractory materials. The molded articles may be of practically any shape or size, provided the walls are not too thick and that suitable precautions are taken in fabricating the molds and pouring the fused batch. The molds may be preheated if desired and in the initial stages may be insulated so as to prevent too rapid loss of heat as, for instance, by embedding them in a molding flask in which they are surrounded by sand or similar material.

They should be provided with risers of ample size to permit complete filling of the mold without interference by material freezing in the headers. Moreover, the headers should be of sufficient size to allow for the contraction of the molten material as it solidifies. If the riser is made wedge shaped with its minimum section immediately adjoining the mold, removal of the excess material constituting a header is facilitated. After a mold is filled it is moved away and additional molds also filled successively.

Instead of pouring the molten refractory material into molds, it is also possible to utilize the furnace itself as a mold, in which case it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc. as in the other type of mold. It is sometimes desirable to provide furnace molds of this type with a small dimensional draft to facilitate removal of the piece from the mold although due to the considerable shrinkage of the fused charge after solidification this is in general unnecessary.

When the outer surface of the casting has had time to solidify thoroughly, it is my practice to remove any insulating material and allow the casting to cool as rapidly as is found to be possible without the production of cracks. During this period the mold itself may in some cases be removed, although it is in general better to allow it to remain around the casting to prevent chilling of the outer face of the casting below a bright red heat, corresponding to perhaps 900° C. In the case of large massive castings somewhat greater cooling of the outer surface is desirable than is the case in thinner pieces. No general rule can be given, the exact duration of the period of rapid cooling being established for each given shape of the piece by a trial and error method; success being judged by breaking the trial castings open and examining the crystal structure with a microscope. If cooling has been sufficient the crystalline constituent will be largely corundum, whereas if cooling has not been sufficient a relatively high percentage of mullite is found. It is not believed necessary to include here directions for identification of these respective minerals, which are quite familiar to the petrographer.

After the casting has cooled sufficiently it should be covered with a good insulating material and allowed to cool slowly for a more or less prolonged period depending upon the shape and size of the piece. Alternately, it may be placed in a furnace operating at 1200 to 1450° C. and after having been held there sufficiently to allow the temperature of the block to become even throughout, it is slowly cooled in the furnace.

It is desirable that the headers leading to the font on the casting should be broken off by sledging before the castings are placed in the furnace or are bedded in insulating material, as the castings are tougher at this stage than when cold and there is less danger of their being cracked than by hammering. After the pieces are cold any objectionable protuberances may be removed by chipping, or in minor cases by grinding.

In the construction of furnaces of this type of cast material, blocks are laid with little or no intervening cement and the number of pieces is usually kept to a minimum. This use of large pieces is advantageous in that the cost of molding per cubic inch of cast material is materially decreased; the bricklaying labor in building the walls is reduced, and difficulties due to the glass or slag causing deep erosion along joints is minimized by minimizing the joints themselves.

Whereas on the diagram I have illustrated the cooling of a block containing approximately 8% of silica, and have stated that I prefer where a particularly resistant refractory article is to be produced that the silica content not exceed 8%, it will be understood that the broad aspects of my invention are as stated in the first part of the specification, the principles thereof being applicable to various compositions running up to 25 or 30% silica.

It may also be noted that the addition of other fluxing materials beside silica somewhat reduces the conversion temperatures corresponding to lines C—D and E—F, which occur at 1810° C. and 1545° C., respectively, in the case of pure materials. It is desirable that the rapid cooling be from a temperature above the upper of these conversion points to a temperature below the lower one, regardless of their particular values. I find that in blocks containing not more than 9% of other oxides which may occur as impurities in the raw materials, rapid cooling to an average temperature of around 1200° C. is sufficient to insure the formation of corundum rather than mullite. A peculiar feature which appears characteristic of castings of this type is that the crystalline form is frequently of a somewhat stringy character, the strings extending perpendicular to the face of the block.

I claim:

1. A cast refractory article composed of alumina and a smaller percentage of silica and consisting principally of corundum crystals and an inter-crystalline glass.

2. A cast refractory article composed essentially of corundum and mullite embedded in a glassy matrix, the proportion of corundum to mullite being at least two to one.

3. In a glass tank wall, cast refractory material composed principally of alumina and silica, and consisting of corundum crystals with substantially less mullite than that corresponding to equilibrium of the composition.

4. The method of producing cast refractory blocks with a large proportion of corundum crystals from raw materials containing alumina and silica which comprises melting raw materials consisting essentially of alumina and silica, casting the molten mixture, and cooling the casting rapidly through the stage at which the crystallization of mullite would result by allowing the mass to come to equilibrium.

5. The method of producing cast refractory pieces composed of a major percentage of alumina and less than 30% silica which are resistant to corrosion by glass and vitreous slags, which comprises casting the molten composition to form a refractory article and cooling the cast article from a temperature above the incongruous melting point of mullite to a temperature below that at which the entire mass becomes solid at a rate sufficient to minimize the formation of mullite.

6. The method of forming refractory castings comprising melting a mixture consisting essentially of silica and alumina, the alumina being present to an extent of at least 70%, casting the molten material, and cooling it rapidly to a temperature approximately 1200° C.

7. A cast refractory comprising alumina and at least 5% of silica, said refractory being composed principally of corundum crystals and an inter-crystalline glass.

8. A cast refractory article composed of a major proportion of alumina and less than 30% silica and consisting essentially of corundum crystals and mullite crystals embedded in a glassy matrix, the proportion of corundum to mullite being at least two to one.

9. A cast refractory article composed of a major proportion of alumina and not more than 8% silica and consisting essentially of corundum crystals and mullite crystals embedded in a glassy matrix, the proportion of corundum to mullite being at least two to one.

10. The method of producing cast refractory articles consisting essentially of a vitreous matrix, corundum crystals and mullite crystals with the corundum crystals predominating, which comprises providing a molten composition with a major proportion of alumina and a minor proportion of silica, casting the molten composition, and rapidly cooling the casting as the cast composition passes through the stage at which corundum crystals are dissolved in the residual liquid.

GEORGE J. EASTER.